United States Patent [19]

Winter et al.

[11] 4,234,999
[45] Nov. 25, 1980

[54] CLAMP ASSEMBLY AND FABRICATION THEREOF

[75] Inventors: John S. Winter, Walnut Creek; Robert L. Moore, El Cerrito, both of Calif.

[73] Assignee: Systron-Donner Corp., Concord, Calif.

[21] Appl. No.: 943,437

[22] Filed: Sep. 18, 1978

[51] Int. Cl.³ .......................................... A44B 21/00
[52] U.S. Cl. ............................. 24/81 G; 24/81 CC; 24/249 LS
[58] Field of Search ............ 24/81 R, 81 CC, 81 DM, 24/81 G, 221 R, 221 A, 248 B, 249 R, 249 LS; 248/74

[56] References Cited

U.S. PATENT DOCUMENTS

| | | | |
|---|---|---|---|
| 2,413,772 | 1/1947 | Morehouse | 24/81 G |
| 2,463,564 | 3/1949 | Rowe | 24/221 A |
| 3,054,586 | 9/1962 | Kirkup | 24/249 LS X |
| 3,060,538 | 10/1962 | Simi | 24/221 A |

Primary Examiner—Kenneth Downey
Attorney, Agent, or Firm—Flehr, Hohbach, Test

[57] ABSTRACT

A clamp assembly for fixedly supporting a tube is disclosed herein and includes a main body member, a secondary body member and a locking member, the latter maintaining the two body members in an interlocked tube supporting position. The locking member is integrally formed to include a shaft, an enlarged head at one end of the shaft and a crossbar at the other end of the shaft. This integral member is interlocked with the secondary body member of the clamp assembly regardless of its position with respect to the main body member, as provided by a special hand tool.

1 Claim, 7 Drawing Figures

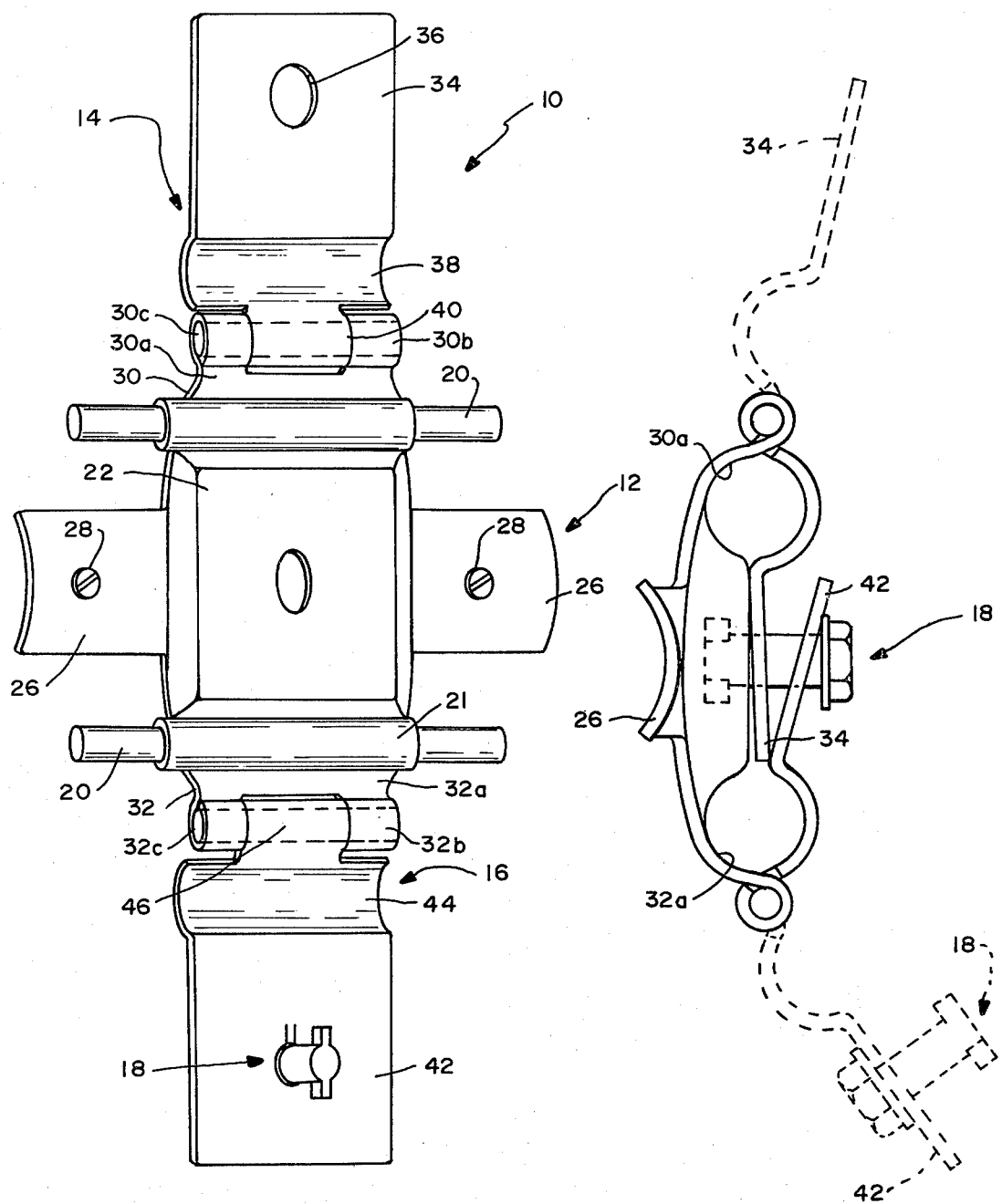
FIG.—1
FIG.—2

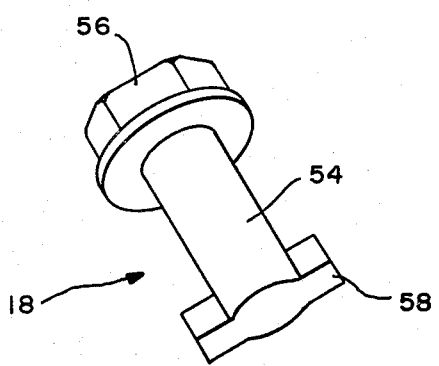
FIG.—3
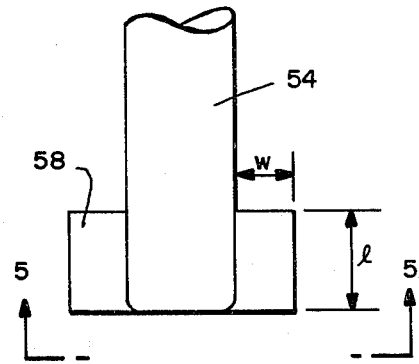
FIG.—4
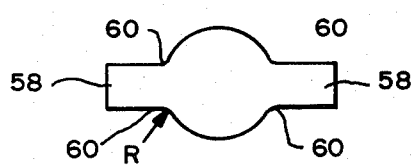
FIG.—5
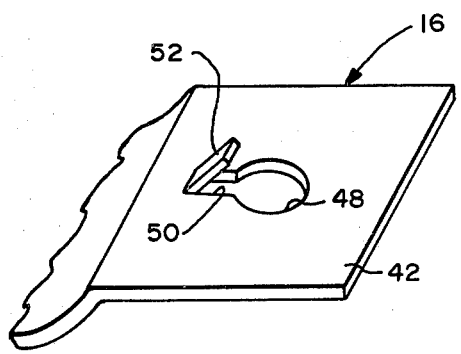
FIG.—6
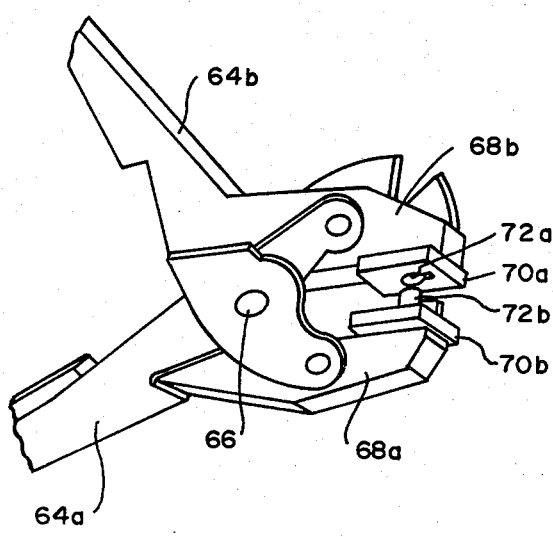
FIG.—7

CLAMP ASSEMBLY AND FABRICATION THEREOF

BACKGROUND OF THE INVENTION

There are a large number of different types of heat sensing devices utilized in fire detection systems presently on the market. One which is specially used in commercial and industrial applications, particularly in commercial airliners, is tubular in configuration and may extend several hundred feet. One such device manufactured by Systron-Donner Corporation, assignee of the present invention, is referred to as a continuous length pneumatic detector. This particular heat sensing device carries helium gas throughout its entire tubular length and operates by monitoring the internal pressure of this gas as the latter expands in response to elevated temperatures.

From the foregoing, it should be apparent that tubular heat sensing devices of the type described are particularly suitable for protecting large areas, particularly engine and ducting areas typically found in commercial airliners. For example, as many as 24 or more individual heat sensing devices which all together extend over more than 300 feet are presently used in a Boeing 747 type airplane. Heretofore, many of these tubular heat sensing devices have been held in place by means of spaced clamp assemblies of a particular design. This prior art clamp assembly includes a main body member adapted for connection to a given support surface and a pivotally connected secondary body member, which when interlocked with the main body, maintains a longitudinal segment of the tubular heat sensing device in place.

In order to interlock together the main body and its pivotally connected secondary body, the overall clamp assembly thus far described uses a two piece locking pin including a main shaft with an integral head at one end and a separate cross pin at the other end. This interlocking pin is fixedly connected with the secondary body member and is adapted for insertion into a cooperating through hole in the main body for rotation therein for interlocking the two body members together.

While the general way in which the clamp assembly just described functions is quite satisfactory for its intended purpose, it does have one particular drawback, specifically with respect to the design of its locking pin. As stated above, this locking pin is itself fixedly connected with the secondary body of the overall assembly and includes an enlarged head on one side of the secondary body member and a cross pin on the other side thereof. While the enlarged head is integrally formed with the shaft of the locking pin as stated, its cross pin is not. Rather, the cross pin is a separate and distinct component which is disposed (actually force fitted) through a cooperating opening extending diametrically through the otherwise free end of the shaft after the latter has itself been inserted through a cooperating opening in the secondary body member thereby interconnecting the two together. There are several disadvantages to this particular arrangement. First, the cross pin has a tendency to break off if too much torque is applied to the overall locking pin when rotating the latter in order to interlock the two body members together. Moreover, even if the pin does not break during initial installation, it has been found that vibration such as that found in an airplane can cause a cross pin to loosen to the extent that it no longer remains within the shaft of the overall locking pin. This, in turn, can cause the two interlocked bodies, that is, the main body and the secondary body of the clamp assembly to separate from one another, thereby relinquishing support of the tubular segment and exposing the latter to the possibility of damage.

As will be seen hereinafter, the present invention is directed to a clamp assembly which, in many respects, may be similar to the clamp assembly just described. However, as will be seen hereinafter, the clamp assembly constructed in accordance with the present invention includes a different locking pin, specifically one which does not have the drawbacks just discussed. The present invention is also directed to a particular way of interconnecting or interlocking the locking pin to the secondary body of the clamp assembly and to a particular hand tool for carrying this out, especially on a prior art clamp assembly which has lost its locking pin.

OBJECTS AND SUMMARY OF THE INVENTION

One object of the present invention is to provide a clamp assembly including a locking pin or locking member, and particularly an uncomplicated and economical locking member having a cross pin or cross bar which is resistant to torque failure and which cannot separate from the rest of the locking member even if subjected to severe vibration.

Another object of the present invention is to provide an uncomplicated and economical method of interlocking the locking pin of the present invention to the secondary body member which comprises part of the overall clamp assembly of the present invention or part of the prior art clamp assembly described previously.

Still another object of the present invention is to provide a particular hand tool which, in part, provides this interlocking method, particularly with respect to combining the integral locking pin of the present invention and a clamp assembly of the prior art which has lost its locking pin.

As will be discussed in more detail hereinafter, the clamp assembly disclosed herein includes a main body member which is adapted for connection to a given support surface and which includes a through hole having a cross sectional configuration longer than it is wide and a tube receiving section to one side of the through hole. A secondary body member is pivotally connected to the main body member and also includes a through hole (circular in configuration) and a tube receiving section. This secondary body member is movable between a first closed position so that the two tube receiving sections cooperate with one another for clamping its associated tube segment in place and a second opened position for freeing the tube segment.

The clamp assembly thus far described may be similar to the one heretofore used in the prior art. Moreover, like the prior art clamp assembly, the clamp assembly constructed in accordance with the present invention includes a locking pin or locking member for maintaining the secondary body member locked in its closed position. However, the locking member disclosed herein includes a shaft having an enlarged head at one end and an integrally formed cross bar or cross pin at the other end. In its preferred embodiment, the entire locking member is integrally formed and the depth of the cross bar is greater than its thickness, thereby acting structurally as a beam rather than a pin, thereby increasing its resistance to torque failure. Moreover, in this preferred embodiment, the lengthwise juncture defined by the shaft and each of the inward lengthwise edges of the cross bar defines a radius of curvature which provides further resistance to torque failure.

The locking member just described is interlocked with the secondary body member by first providing in the latter (1) a slot extending up from its through hole sufficient to allow passage of the cross bar and (2) a tab bendable between a slot opening position outside the slot and a slot closing position within the slot. This tab is initially maintained in its slot opened position and the cross bar inserted through the hole and slot in the secondary body member for locating the shaft of the locking member therethrough. With the cross bar and enlarged head of the locking member on opposite sides of the through hole, the tab is moved back to its slot closing position for preventing withdrawal of the shaft, thereby interlocking the locking member with the secondary body member together.

In a preferred embodiment of the present invention, the slot just described and the tab are simultaneously formed by means of a specifically designed hand tool. Moreover, this hand tool is especially suitable for punching out the slot and forming the tab in the secondary body member of a prior art clamp assembly which has lost its locking pin. In this way, an integrally formed locking pin constructed in accordance with the present invention can be readily incorporated into the existing clamp assembly thereby eliminating the necessity to replace the entire assembly.

BRIEF DESCRIPTION OF THE DRAWINGS

FIG. 1 is a perspective view of a clamp assembly which is constructed in accordance with the present invention and which is illustrated in its open, nonclamping position.

FIG. 2 is a side elevational view of the clamp assembly shown in FIG. 1 but is illustrated in its closed position.

FIG. 3 is a perspective view of a locking pin or locking member which comprises part of the clamp assembly of FIGS. 1 and 2 and which is constructed in accordance with the present invention.

FIG. 4 is a vertical elevational view of the bottom end of the locking member illustrated in FIG. 3.

FIG. 5 is a cross sectional view of the locking member taken generally along line 5—5 in FIG. 4.

FIG. 6 is an enlarged perspective view of a part of the clamp assembly illustrated in FIGS. 1 and 2, particularly showing a detail of the latter with the locking pin removed for purposes of clarity.

FIG. 7 is a perspective view of a hand tool which is constructed in accordance with the present invention and which is provided for interlocking the locking member with that portion of the clamp assembly illustrated in FIG. 6.

DETAILED DESCRIPTION AND PREFERRED EMBODIMENTS

Turning to the drawings, wherein like components are designated by like reference numerals throughout the various figures, a clamp assembly constructed in accordance with the present invention is illustrated in FIGS. 1 and 2 and generally designated by the reference numeral 10. As will be discussed in more detail hereinafter, this assembly includes a main body 12 and two hinged sections or secondary bodies 14 and 16, each of which is preferably an integrally formed component constructed of sheet metal or other relatively inexpensive and readily formable but strong material. These three components, the main body and its two hinged sections or secondary bodies together with a locking member 18 constructed in accordance with the present invention fixedly support longitudinal sections of two tubes 20. While these tubes can be of any type, assembly 10 is especially suited for supporting tubular heat sensing devices of the type described previously. In an actual working embodiment, each tube is one half inch in diameter and is supported by clamp assembly 10 located at six to eight inch intervals. A grommet 21 may be provided around each tube section for purposes of sizing and protection.

With the exception of locking member 18 and the way it interconnects with one of the secondary bodies, clamp assembly 10 thus far described may be similar to one available in the prior art. As seen best in FIG. 1, main body 12 includes a somewhat rectangular raised section 22 including a central through hole 24 which is longer than it is wide, that is, somewhat oval in configuration. This main body member also includes two flanged sections 26 extending out from opposite sides of raised section 22 for fixedly attaching the entire assembly to a given support surface (not shown). In this regard, each flange section includes its own centrally located hole through which a screw 28 or other suitable fastening means may be inserted for fastening to the given support surface. On each of the remaining sides of raised section 22 is a combined tube and pivot pin supporting section 30 and 32, respectively. Each of these sections curves outwardly for defining a tube receiving surface 30a and 32a (see FIG. 2) and includes spaced arms 30b, 32b for carrying pivot pins 30c, 32c.

Having described main body member 12 attention is now directed to the hinged sections or secondary bodies 14 and 16. As seen best in FIG. 1, secondary body member 14 includes a somewhat planar section 34 having a centrally located, circular through hole 36. As best seen in FIG. 2, this secondary member bends outward from one side of through hole 36 for defining a tube receiving surface 38 which confronts tube receiving surface 30a when the assembly is in its tube supporting position. Finally, secondary body member 14 includes a pivot pin receiving section 40 which is located between arms 30b for receiving pivot pin 30c. In this way, secondary body member 14 is pivotally connected with main body member 12 for movement between the dotted line position illustrated in FIG. 2 (the solid line position in FIG. 1) and the solid line position in FIG. 2.

With one exception to be discussed, secondary body 16 may be identical in construction to secondary body 14. Hence, body 16 includes a somewhat planar section 42, an adjacent section defining a tube receiving surface 44 in confronting relation with surface 32a when the assembly is in its tube supporting position, and a pivot pin receiving section 46 located between arms 32b for receiving pivot pin 32c. As a result, secondary body member 16 is pivotally connected to main body member 12 for movement between the dotted line and solid line positions of FIG. 2.

The only difference between the two secondary bodies is that body member 14 includes a circular through hole 36 as described previously whereas body member 16 includes a smaller circular through hole 48. Moreover, the latter body includes a slot 50 extending out from its through hole a predetermined amount and a tab 52 which is bendable between a slot opening first position (as illustrated in FIG. 6) and a slot closing position within the slot (as illustrated in FIG. 1).

Having described main body member 12 and its associated secondary body members, attention is now directed to FIGS. 3, 4 and 5 for a description of locking member 15. As stated previously, this locking member is preferably integrally formed in its entirety, specifically being constructed of stainless steel and forged into the shape illustrated in an actual embodiment. As best seen in FIG. 3, this locking member includes a longitudinally extending shaft or stud 54, an enlarged head 56 at one end of the shaft, and a cross bar 58 at the other end. In a preferred embodiment, head 56 is multi-sided (hexagonal in the actual embodiment) for use with a wrench or the like. While the head may include a slot for cooperation with a standard screwdriver or a central cross opening for cooperation with a Phillips screwdriver, in a preferred method of clamping the assembly to be discussed, a wrench or similar tool is preferred over a screwdriver since the latter could slip away from the enlarged head and possibly damage surrounding equipment.

As stated previously, cross bar 58 is an integral part of shaft 54. As best seen in FIG. 4, this cross bar is longer (L) than it is wide (W) on each side of shaft 54. For example, in one working embodiment of the present invention, each side of the cross bar is about 0.10" long and about 0.68" wide. In this way, from a structural standpoint, the cross bar acts as a beam rather than a pin providing resistance to torque failure. In this working embodiment, the thickness of the cross bar is about 0.04", the shaft is about 0.255" long and its diameter is about 0.120". As best seen in FIG. 5, the lengthwise junctures 60 (four in all) defined by shaft 54 and each of the inward lengthwise edges of cross bar 58 (both sides) define radii of curvature (R) which add further resistance to torque failure. In the actual working embodiment, the radius of curvature at each juncture 60 is approximately 0.04".

Having described locking member 18, attention is now directed to the manner in which the locking member is interlocked in the secondary body member 16 and the way in which the entire assembly is clamped together to support previously described tubes 20 and their associated grommets 21. Referring first to FIG. 6, it can be seen that tab 52 is initially maintained in its slot opening position. As stated previously, the slot itself is of a predetermined length. More specifically, this slot is of sufficient length (actually size) so as to allow the entire crossbar 58 of locking member 58 to pass through hole 48 (in combination with slot 50) so as to dispose shaft 54 within the hole 48. In this regard, hole 48 in and by itself (that is, without slot 50) is sufficiently large to allow shaft 54 to freely rotate therein and smaller than either head 56 or cross bar 58. In this way, once the cross bar is inserted through the combination through hole and slot, the tab 52 is bent back to its slot closing position, filling the slot and interlocking the entire locking member with secondary body 16. It should be apparent that it would not be practical to provide a slot sufficiently large to pass head 56 so long as the latter is of the shape illustrated. However, it should be equally apparent that the slot could from a practical standpoint be designed to pass an enlarged head of a shape similar to that of cross bar 58.

In any event, once locking member is interlocked within through hole 48, the two grommeted sections of tubes 20 may be positioned against tube receiving surfaces 30a and 32a of main body member 12 as illustrated in FIG. 1. Thereafter, secondary body member 14 is folded over to its solid line position in FIG. 2 so that through hole 36 is located in confronting relation with through hole 24 and its surface 38 confronts surface 30a. In this regard, it is to be pointed out (1) that through hole 36 is sufficiently large in diameter to completely pass cross bar 58 and (2) that through hole 24 along its length is also of sufficient size to pass the entire cross bar. However, through hole 24 is only slightly wider than the diameter of shaft 54 in width. Once secondary body 14 has been positioned in the manner just described, secondary body member 16 is moved to its solid line position illustrated in FIG. 2. As this is carried out, cross bar 58 passes through hole 36 and is aligned lengthwise with hole 24 for passing through it, as best seen in FIG. 2. Thereafter, the entire locking member is rotated by means of a wrench or similar device (or by means of a screw driver if desired) approximately 90° so that cross bar 58 is locked within through hole 24 and against the back side of raised section 22. In this way, the entire assembly is interlocked in the position illustrated in FIG. 2 for locking the grommeted sections of tubes 20 in place.

Having described clamp assembly 10 and the way in whch it supports the two grommeted sections of tubes 20, it should be apparent that the assembly could be readily provided for supporting only one such section, as stated previously. In this case, secondary body member 14 would be completely eliminated and, in all other respects, the two assemblies would be substantially identical. The only possible difference might be that planar section 42 of secondary body member 16 would be flush with the front face of raised section 22 of main body member 12 when secondary body member 14 is eliminated.

Obviously, overall clamp assembly 10 may be manufactured in any suitable manner and, with one exception, its particular method of manufacture forms no part of the present invention. However, the way in which slot 50 and tab 52 are provided does form part of the present invention, at least with respect to the formation of these elements in an existing clamp assembly. More specifically, in the assembly which is constructed in accordance with the present invention slot 50 and tab 52 are formed along with through hole 48 by means of a machine during fabrication of the entire secondary body member 16. However, the slot and tab may be simultaneously provided after formation of through hole 48 by means of a hand tool to be described with respect to FIG. 7. In fact, where an existing clamp assembly is modified to use a locking member 18, as discussed previously, the hand tool to be described is utilized in accordance with the present invention.

Turning to FIG. 7, it can be seen that this hand tool which is generally designated by the reference numeral 62 takes the general form of a pair of pliers and hence includes two handle sides 64a and 64b which are hinged together at 66 for supporting a two heads or jaws 68a and 68b which are movable towards and away from one another by a pliers-like movement of the handle. These jaws heads incorporate a brazed and shear die set generally designated at 70a and 70b. Female die 70a includes an opening which has the combined configuration of previously described through hole 48 and slot 50. On the other hand, male die 70b supports a projection 72b which is complementary in shape to opening 72a and which is received by the latter when the two jaws and dye heads are brought together. In this way, the tool acts as a dye punch. In actual operation, let it be assumed that planar section 42 illustrated in FIG. 6 does not include a slot 50 or tab 52. To provide the slot and tab, this planar section is positioned between the two dyes so that the circular portion of opening 72a and the cylindrical portion of projection 72b are aligned with through hole 48. In this way, as the two dies are squeezed together, the slot 50 is punched out and the tab 52 is simultaneously produced.

What is claimed is:

1. A clamp assembly for fixedly supporting segments of two tubes, comprising:
   (a) a main body member adapted for connection to a given support surface and including a through hole having a cross sectional configuration which is longer than it is wide and first and second tube receiving section on opposite sides of said through hole;
   (b) a first secondary body member including a through hole and a tube receiving section to one side of said last-mentioned hole, said first secondary body member being pivotally connected with said main body member for movement between a first closed position such that its tube receiving section cooperates with the first of said tube receiving sections of said main body member for clamping a segment of one of said tubes in place, and a second opened position for freeing said tube segment;
   (c) a locking member for maintaining said secondary body member locked in said closed position, said locking member including a shaft extending through said secondary through hole for rotation therein, an integrally formed enlarged head at one end of said shaft and a cross bar integrally formed with and extending normal to the other end of said shaft, said enlarged head being adapted for engagement by a separate tool for rotating said shaft and cross bar and said cross bar being shaped for insertion into said primary through hole and for locking in place therein upon rotation thereof;
   (d) said secondary body member including a slot extending out from said secondary through hole sufficient to allow passage of either said cross bar or enlarged head through said hole, and a tab bendable between a slot opening first position outside said slot and a slot closing position within said slot; and
   (e) a second secondary body including a through hole sufficiently large in cross section to allow passage of said cross bar therethrough and a tube receiving section to one side of the latter hole, said second secondary body member being pivotally connected with said main body member for movement between a first closed position such that its tube receiving section and the tube receiving section of said main body cooperate with one another for clamping a segment of a second one of said tubes in place, and a second opened position for freeing said second tube segment, said shaft of said locking member extending through said hole in said second secondary member when the latter is in its closed position for locking said second secondary member in place.

* * * * *